(12) United States Patent
Tobita et al.

(10) Patent No.: US 6,660,312 B2
(45) Date of Patent: Dec. 9, 2003

(54) EGG YOLK-CONTAINING, REDUCED-CHOLESTEROL, OIL-IN-WATER EMULSIFIED FOOD AND THE PREPARATION THEREOF

(75) Inventors: Masao Tobita, Fuchu (JP); Kunihiko Hayashi, Fuchu (JP); Masahiro Goto, Fuchu (JP); Mari Yamada, Fuchu (JP); Yuji Ogino, Fuchu (JP); Satoshi Teraoka, Fuchu (JP)

(73) Assignee: Kewpie Kabushiki Kaisha, Tokyo (JP)

( * ) Notice: Subject to any disclaimer, the term of this patent is extended or adjusted under 35 U.S.C. 154(b) by 50 days.

(21) Appl. No.: 10/127,158

(22) Filed: Apr. 19, 2002

(65) Prior Publication Data

US 2003/0044507 A1 Mar. 6, 2003

(30) Foreign Application Priority Data

| Apr. 20, 2001 | (JP) | ................. | 2001-122030 |
| Feb. 15, 2002 | (JP) | ................. | 2002-037763 |
| Feb. 15, 2002 | (JP) | ................. | 2002-037764 |

(51) Int. Cl.$^7$ ................. A23L 1/24
(52) U.S. Cl. ................. 426/47; 426/330.1; 426/605
(58) Field of Search ................. 426/47, 330.1, 426/558, 568, 605, 654, 425

(56) References Cited

U.S. PATENT DOCUMENTS 5,028,447 A  7/1991  Schenk ................. 426/605

FOREIGN PATENT DOCUMENTS

| JP | 1-199559 | 8/1989 |
| JP | 7-39341 | 2/1995 |
| JP | 8-23918 | 1/1996 |
| JP | 11137209 | 5/1999 |
| JP | 3081038 | 6/2000 |

*Primary Examiner*—Keith Hendricks
(74) *Attorney, Agent, or Firm*—Webb Ziesenheim Logsdon Orkin & Hanson, P.C.

(57) ABSTRACT

Disclosed herein is a method for producing an oil-in-water emulsified food having an egg yolk content as calculated in terms of raw egg yolk of 2.8% or more, a content of cholesterol derived from egg yolk of $7\times10^{-4}\%$ or more, and a total cholesterol content of less than $6\times10^{-3}\%$. This method comprises the steps of subjecting an egg yolk fluid to enzymatic processing, thereby converting phospholipids contained in the egg yolk into lysophospholipids; subjecting the enzymatically processed egg yolk to processing for reducing cholesterol, thereby obtaining processed dry egg yolk retaining at least 0.1% of cholesterol; and mixing the processed dry egg yolk with other ingredients in an amount of at least 0.7% of all the ingredients used. The product obtained by this method has a significantly reduced cholesterol content although its egg yolk content is high. Further, this product is excellent in emulsion stability and thus scarcely undergoes separation during storage. Furthermore, the product has the characteristic flavor and rich taste of egg yolk. By the addition of egg white in an amount of 6% or more as calculated in terms of raw egg white, or xanthane gum in an amount of 0.03% or more, there can be obtained the oil-in-water emulsified food more excellent in emulsion stability.

21 Claims, No Drawings

EGG YOLK-CONTAINING, REDUCED-CHOLESTEROL, OIL-IN-WATER EMULSIFIED FOOD AND THE PREPARATION THEREOF

FIELD OF THE INVENTION

The present invention relates to egg yolk-containing, oil-in-water emulsified foods such as mayonnaise, tartar sauce and dressings, having reduced cholesterol contents.

BACKGROUND OF THE INVENTION

A demand for reduced-cholesterol foods has been increasing in recent years. However, oil-in-water emulsified foods such as mayonnaise, tartar sauce and dressings, whose main ingredient is egg yolk, inevitably contain at least a certain level of cholesterol. This is because egg yolk itself contains approximately 1.2% of cholesterol and also because some vegetable oils, which may be added as another essential ingredient, contain low levels of cholesterol.

Heretofore, there have been proposed mayonnaise-like foods which are produced without using egg yolk to attain the reduction of cholesterol level (Japanese Patent Laid-Open Publication No. 39341/1995, etc.). In the production of foods of this type, one cannot make use of the excellent emulsifying effect egg yolk has, and thus one should instead add emulsifiers or emulsion stabilizers such as starch, when required. Besides, these foods are lacking in the characteristic flavor and rich taste (superior taste) of egg yolk. Thus, yolk-free, mayonnaise-like foods that are satisfactory from the viewpoint of taste have not been obtained to date.

Further, there have also been proposed oil-in-water emulsified foods which are produced by using substantially the same level of egg yolk as in conventional mayonnaise but which have reduced cholesterol contents. For instance, a method for producing an oil-in-water emulsified food from reduced-cholesterol egg yolk is proposed in Japanese Patent Laid-Open Publication No. 23918/1996. According to this method, egg yolk and an edible oil are firstly mixed; from the resultant mixture, the edible oil is then removed by separation to obtain reduced-cholesterol egg yolk wherein approximately 40 to 90% of the cholesterol originally contained in the egg yolk has been extracted; and the reduced-cholesterol egg yolk is used in an amount of approximately 5 to 25% to produce an oil-in-water emulsified food. The oil-in-water emulsified food thus obtained however still contains at least $6 \times 10^{-3}\%$ of cholesterol.

Furthermore, Japanese Patent Laid-Open Publication No. 137209/1999 describes a method for producing an oil-in-water emulsified food, characterized in that low-cholesterol egg yolk obtained by subjecting egg yolk to processing with supercritical carbon dioxide to reduce its cholesterol content by approximately 60 to 95% is used together with enzymatically processed egg yolk. In this method, however, enzymatically processed egg yolk, from which cholesterol has not been removed, is used in an amount of 0.5% or more, so that the resulting oil-in-water emulsified food still contains more than $6 \times 10^{-3}\%$ of cholesterol.

Thus, there have not yet been succeeded in producing, using conventional levels of egg yolk, oil-in-water emulsified foods having reduced cholesterol contents of less than $6 \times 10^{-3}\%$.

Under these circumstances, we made studies to overcome the aforementioned drawbacks in the prior art, and came up with the idea of using, as an egg yolk ingredient of an oil-in-water emulsified food, low-cholesterol dried egg yolk according to Japanese Patent No. 3081038, obtainable by subjecting egg yolk to enzymatic processing, followed by processing with supercritical carbon dioxide. We continued our studies and found the following: if egg yolk is directly subjected to processing with supercritical carbon dioxide, almost all cholesterol contained in the egg yolk can be removed, but the egg yolk loses its emulsifying effect to a significant extent. This is probably because proteins and the like contained in egg yolk are severely damaged and modified in the course of the processing with supercritical carbon dioxide. However, we considered that if egg yolk is subjected to enzymatic processing for improving its emulsifying effect prior to the processing with supercritical carbon dioxide, it must be possible for us to prevent, to some extent, the egg yolk from losing its emulsifying effect in the course of the processing with supercritical carbon dioxide, whereby processed egg yolk containing almost no cholesterol can successfully be obtained while retaining the emulsifying effect. We further carried out our studies and came to have such a thought that if the processed egg yolk obtained in the above-described manner is used, an oil-in-water emulsified food containing almost no cholesterol can be obtained even if the egg yolk level is nearly equal to that in conventional mayonnaise.

To confirm this thought, we tried variously to prepare oil-in-water emulsified foods with the use of the egg yolk substantially free from cholesterol, obtained by subjecting egg yolk first to enzymatic processing and then to processing with supercritical carbon dioxide. The emulsified foods thus obtained were found to have poor emulsion stability, that is, they were readily separated into aqueous phase and oil phase during storage.

Meanwhile, Japanese Patent Laid-Open Publication No. 199559/1989 discloses a related technique. This technique, relating to a method for producing low-cholesterol dressings, is characterized in that egg yolk which has been subjected to processing for reducing cholesterol and also to phospholipase processing is used together with gelatinized starch. Admittedly, this publication describes the use of "modified egg yolk containing substantially no cholesterol." However, with respect to the reduction of emulsion stability caused by the use of the egg yolk which has been subjected to processing for reducing cholesterol, the publication fails to describe any means for solving this problem, or even to mention this problem. The reason for this is probably as follows: as the dressings described in this publication have an egg yolk content lower than that of conventional mayonnaise, and contain gelatinized starch which is considered to be effective in improving emulsion stability, the inventors of the prior art did not notice at all that egg yolk loses its emulsifying effect to a significant extent when subjected to processing for reducing cholesterol.

Objects of the present invention are therefore to provide an oil-in-water emulsified food having a dramatically reduced cholesterol content but having a high egg yolk content, having emulsion stability high enough to prevent separation into aqueous phase and oil phase during storage, and having the characteristic flavor and rich taste (superior taste) of egg yolk, and to provide a method for producing such oil-in-water emulsified foods.

SUMMARY OF THE INVENTION

We made extensive studies in order to attain the above objects, and, as a result, have found that an oil-in-water emulsified food having high emulsion stability and scarcely undergoing separation during storage can be obtained if processing with supercritical carbon dioxide, to which the egg yolk already enzymatically processed is subjected, is so controlled that the resulting processed egg yolk can have a cholesterol content not lower than a specific level. The present invention has been accomplished on the basis of this finding.

The present invention, in a first aspect, therefore provides an oil-in-water emulsified food having an egg yolk content as calculated in terms of raw egg yolk of 2.8% or more, a content of cholesterol derived from egg yolk of $7 \times 10^{-4}$% or more, and a total cholesterol content of less than $6 \times 10^{-3}$%.

The present invention, in a second aspect, provides a method for producing an oil-in-water emulsified food, comprising the steps of subjecting an egg yolk fluid to enzymatic processing, thereby converting phospholipids contained in the egg yolk into lysophospholipids; subjecting the enzymatically processed egg yolk to processing for reducing cholesterol, thereby obtaining processed dry egg yolk still retaining at least 0.1% of cholesterol; and mixing the processed dry egg yolk with other ingredients in an amount of at least 0.7% of all the ingredients used, thereby obtaining the above-described oil-in-water emulsified food.

We followed up our studies and have newly found the following fact: the oil-in-water emulsified food obtained by the above-described method is stable and can remain unchanged over a long period of time when stored at low temperatures around 10° C.; however, when stored at approximately 20° C., although it remains unchanged over 3 to 4 months, it tends to undergo separation due to partial destruction of its emulsified state when stored for 5 months or more. We therefore made studies furthermore in order to solve this problem and have found that the oil-in-water emulsified food which further contains egg white in an amount of 6% or more as calculated in terms of raw egg white is stable and remains unchanged even when stored at normal temperature for a prolonged period of time (at 20° C. for 5 months or more). Alternatively, the oil-in-water emulsified food further containing 0.03% or more of xanthane gum has also been found stable over a longer period of time.

Therefore, the present invention, in another aspect, provides an oil-in-water emulsified food having an egg yolk content as calculated in terms of raw egg yolk of 2.8% or more, an egg white content as calculated in terms of raw egg white of 6% or more, a content of cholesterol derived from egg yolk of $7 \times 10^{-4}$% or more, and a total cholesterol content of less than $6 \times 10^{-3}$%.

The present invention, in a further aspect, provides an oil-in-water emulsified food having an egg yolk content as calculated in terms of raw egg yolk of 2.8% or more, a xanthane gum content of 0.03% or more, a content of cholesterol derived from egg yolk of $7 \times 10^{-4}$% or more, and a total cholesterol content of less than $6 \times 10^{-3}$%.

The present invention, in a still further aspect, provides a method for producing an oil-in-water emulsified food, comprising the steps of subjecting an egg yolk fluid to enzymatic processing, thereby converting phospholipids contained in the egg yolk into lysophospholipids; subjecting the enzymatically processed egg yolk to processing for reducing cholesterol, thereby obtaining processed dry egg yolk still retaining at least 0.1% of cholesterol; and mixing the processed dry egg yolk with egg white or xanthane gum and other ingredients in amounts of at least 0.7%, and at least 6% as calculated in terms of raw egg white or at least 0.03%, respectively, based on all the ingredients used, thereby obtaining the above-described oil-in-water emulsified food.

In this specification, "%" means "% by weight", unless otherwise specified.

DETAILED DESCRIPTION OF THE INVENTION

The oil-in-water emulsified food according to the present invention is composed of aqueous phase ingredients and oil phase ingredients present in the form of an emulsion of oil-in-water type. In other words, the emulsified food of the invention is such an emulsion that oil droplets are dispersed in an aqueous phase, and specifically includes mayonnaise, tartar sauce and emulsion-type dressings. In the present invention, 10–90% of aqueous phase ingredients and 90–10% of oil phase ingredients are mixed, these percentages varying depending upon the objective food. In general, 20–70% of aqueous phase ingredients and 80–30% of oil phase ingredients are mixed.

The egg yolk content as calculated in terms of raw egg yolk of the oil-in-water emulsified food according to the present invention is 2.8% or more. The term "egg yolk" as used herein refers not only to raw or dried egg yolk but also to processed liquid or dry egg yolk obtained by subjecting raw or dried egg yolk to enzymatic processing, processing for reducing cholesterol, or the like. If the egg yolk content as calculated in terms of raw egg yolk is less than 2.8%, the oil-in-water emulsified food, final product, becomes poor in emulsion stability, so that it tends to undergo separation during storage, and, in addition, the product hardly has the characteristic flavor and rich taste of egg yolk. When the egg yolk content is 4.8% or more, the flavor and taste of the product become comparable to those of conventional mayonnaise; this egg yolk content range is therefore more preferred. However, if the egg yolk content is in excess of 30%, the product has a taste greatly different from that of conventional mayonnaise.

The oil-in-water emulsified food of the present invention has a content of cholesterol derived from egg yolk of $7 \times 10^{-4}$% or more, and a content of cholesterol derived from all the ingredients including egg yolk (referred to as "total cholesterol content" in the present invention) of less than $6 \times 10^{-3}$%. Those oil-in-water emulsified foods having an egg yolk-derived cholesterol content of less than $7 \times 10^{-4}$% are poor in emulsion stability, and readily undergo separation during storage. Further, those oil-in-water emulsified foods having a total cholesterol content of $6 \times 10^{-3}$% or more cannot be a solution of the problems in the prior art as mentioned previously in connection with Japanese Patent Laid-Open Publication No. 23918/1996 and the like.

In the present invention, cholesterol contents were measured in accordance with "Cholesterol Quantitative Analytical Method A" described in "Analysis Manual" included in "Standard Tables of Food Composition in Japan" published in January, 1997 by the Food Composition Section of Resources Council, Science and Technology Agency, Japan.

In one aspect of the present invention, the oil-in-water emulsified food contains egg white in an amount of 6% or more as calculated in terms of raw egg white. The term "egg white" as herein used refers to an egg fluid obtained by separating egg yolk from a whole egg; specifically, it refers to raw egg white, sterilized egg white, egg white obtained by thawing frozen egg white, egg white obtained by reconstituting dried egg white with water, or the like. If the egg white content as calculated in terms of raw egg white of the oil-in-water emulsified food, final product, is less than 6%, the product tends to undergo separation due to partial destruction of its emulsified state that may occur during storage at normal temperature for a prolonged period of time (at 20° C. for 5 months or more); such a product is not acceptable as an emulsified product. When the egg white content as calculated in terms of raw egg white is 7% or more, the oil-in-water emulsified food has separation resistance comparable to that of conventional mayonnaise; this egg white content range is therefore more preferred. However, if the egg white content is in excess of 20%, the product has a taste greatly different from that of conventional mayonnaise.

In another aspect of the present invention, the oil-in-water emulsified food contains at least 0.03% of xanthane gum instead of egg white. If the oil-in-water emulsified food, final product, contains less than 0.03% of xanthane gum, the product tends to undergo separation due to partial destruction of its emulsified state that may occur during storage at normal temperature for a prolonged period of time (at 20° C. for 5 months or more); such a product is not suitable as an emulsified product. When the xanthane gum content is 0.05% or more, the oil-in-water emulsified food can have separation resistance comparable to that of conventional mayonnaise, so that this xanthane gum content range is more preferred. However, the separation resistance effect peaks at the xanthane gum content of 0.3%, so that the addition of more than 0.3% of xanthane gum is not practical.

If both egg white and xanthane gum are used together in amounts within the above-described ranges, the resulting oil-in-water emulsified food of the invention shows higher resistance to separation.

Into the oil-in-water emulsified food of the present invention, phytosterols which have the action of lowering blood cholesterol levels may be incorporated. Examples of phytosterols useful herein include α-sitosterol, β-sitosterol, stigmasterol, ergosterol and campesterol, and derivatives thereof such as fatty esters thereof, ferulic esters thereof and glycosides thereof.

It is said that the intake of phytosterols required to lower blood cholesterol levels is generally at least 0.4 g per day and that Japanese individuals take approximately 15 g of mayonnaise at one meal. This means that if phytosterols are incorporated into the oil-in-water emulsified food (mayonnaise) of the present invention so that 15 g of the mayonnaise contains at least 0.4 g of phytosterols (i.e., the content of phytosterols in the mayonnaise is 2.7% or more), it becomes possible to lower blood cholesterol levels by taking the mayonnaise only once a day. However, if the phytosterols content exceeds 10%, the oil-in-water emulsified food tends to become rough and unpleasant to the tongue.

A method for producing such an oil-in-water emulsified food of the present invention will be described hereinafter.

Raw egg yolk, or an egg yolk fluid prepared, for example, by reconstituting dried egg yolk with water is firstly subjected to enzymatic processing to convert phospholipids contained in the egg yolk into lysophospholipids. An enzyme usually used for the enzymatic processing is phospholipase A. If egg yolk is processed using phospholipase A, this enzyme acts on the constitutive phospholipids of egg yolk lipoproteins (complexes composed of egg yolk lipids such as egg yolk phospholipids and egg yolk proteins; main component of egg yolk), and the fatty acid residue in position 1 or 2 of the phospholipids is hydrolyzed; the phospholipids are thus converted into lysophospholipids. For example, the enzymatic processing can be carried out at a pH between 6 and 8, at a temperature between 45° C. and 55° C. for about 2 to 12 hours with the enzyme concentration adjusted to approximately $1 \times 10^{-4}$ to $2 \times 10^{-2}$%.

In the present invention, the mass percentage of lysophosphatidylcholine on the total mass of lysophosphatidylcholine and phosphatidylcholine (hereinafter referred to as "lyso-percentage") determined by the IATROSCAN method (the TLC-FID method) after conducting the above-described enzymatic processing is preferably 10% or more, more preferably 30% or more. When enzymatically processed egg yolk whose lyso-percentage is less than 10% is used, the resulting oil-in-water emulsified food is readily cracked or undergoes separation, and, moreover, tends to become musty during long-term storage. On the other hand, if enzymatically processed egg yolk whose lyso-percentage is more than 90% is used, the resulting oil-in-water emulsified food tends to be somewhat bitter.

Subsequently, the enzymatically processed egg yolk fluid is subjected to processing for reducing cholesterol, using supercritical carbon dioxide. It is preferable to dry the enzymatically processed egg yolk fluid before subjecting it to the processing for reducing cholesterol. By doing so, it becomes possible to more efficiently conduct the processing for reducing cholesterol, using supercritical carbon dioxide. Any means can be employed to dry the enzymatically processed egg yolk, and it is enough to reduce the water content of the enzymatically processed egg yolk to approximately 1 to 6% by such a means as spray or freeze drying. In this step of drying, cholesterol contained in the egg yolk is also concentrated, and the resulting dried egg yolk is to have a cholesterol content of approximately 2 to 3%.

Supercritical carbon dioxide which is used for the above-described processing for reducing cholesterol refers to carbon dioxide at a temperature of 31.0° C. (critical temperature) or more and at a pressure of 7.14 MPa (critical pressure) or more. Particularly preferred herein is supercritical carbon dioxide at a temperature between 35° C. and 45° C. and at a pressure between 13 MPa and 35 MPa.

The processing for reducing cholesterol, using such supercritical carbon dioxide may be conducted in a conventional manner. It is however necessary to control this processing so that the resulting processed dry egg yolk still retains a cholesterol content of 0.1% or more, more preferably 0.15% or more. If the processed dry egg yolk whose cholesterol content has been reduced to less than 0.1% is used, the resulting oil-in-water emulsified food is unstable and tends to undergo separation during storage although the reason for this is unknown.

A process for producing an oil-in-water emulsified food from the processed dry egg yolk that has been subjected to the processing for reducing cholesterol, and egg white and/or xanthane gum separately prepared is, if the objective food is mayonnaise, not different from the conventional mayonnaise production process. That is to say, after thoroughly mixing by stirring the processed dry egg yolk obtained in the above-described manner, egg white and/or xanthane gum, water, vinegar and other seasonings, edible oil is added to the mixture, and stirring is continued for emulsification. It is herein necessary that the processed dry egg yolk be incorporated in an amount of at least 0.7% of all the ingredients used. This is because the processed dry egg yolk in a small amount of less than 0.7% cannot impart the characteristic flavor and rich taste of egg yolk to the resulting oil-in-water emulsified food. It is noted that at least 0.7% of the processed dry egg yolk is equivalent to at least approximately 2.8% of raw egg yolk.

In the case where egg white is used, the egg white content of the oil-in-water emulsified food is 6% or more as calculated in terms of raw egg white, based on all the ingredients used. In the case where xanthane gum is used, the xanthane gum content of the oil-in-water emulsified food is 0.03% or more, based on all the ingredients used. By incorporating egg white and/or xanthane gum, it is possible to obtain an oil-in-water emulsified food that does not readily undergo separation even when stored at 20° C. for 5 months or more.

In addition to the aforementioned ingredients, a variety of ingredients usually used for producing conventional emulsified foods may be used as ingredients of the oil-in-water emulsified food of the invention according to the type of the objective food. For example, if the emulsified food is mayonnaise, there may be used seasonings such as table salt and sugar, synthetic seasonings such as sodium glutamate, spices such as mustard powder and oil mustard, and the like. In the case where the emulsified food is tartar sauce, such ingredients as chopped pickles and onion may be added. Further, if a low-calorie mayonnaise-like food containing a reduced level of edible oil is an objective food, soybean proteins, starch, dextrin, cellulose, etc. can be incorporated.

EXAMPLES

The present invention will now be explained more specifically by referring to the following Examples and Test Examples.

Example 1

In accordance with the formulation below, an oil-in-water emulsified food of mayonnaise type was produced in the following manner: the aqueous phase ingredients were thoroughly mixed; the oil phase ingredient was added to the mixture with stirring; and the resulting mixture was emulsified by a conventional method.

It is noted that the processed dry egg yolk in the formulation below was prepared in the following manner: an egg yolk fluid was subjected to enzymatic processing with phospholipase $A_2$, thereby converting phospholipids contained in the egg yolk into lysophospholipids; the enzymatically processed egg yolk was dried; and the dried egg yolk was then subjected to processing for reducing cholesterol, using supercritical carbon dioxide. The processed dry egg yolk obtained in this manner and used in this example had a lyso-percentage of 60% and a cholesterol content of 0.2%.

| Ingredient | Percentage (%) |
| --- | --- |
| Oil phase ingredient: | |
| Vegetable oil | 77.5 |
| Aqueous phase ingredients: | |
| Water | 9.0 |
| Vinegar | 5.0 |
| Raw egg white | 4.0 |
| Processed dry egg yolk | 1.8 |
| (Percentage as calculated in | |
| terms of raw egg yolk: approx. 7.2%) | |
| Table salt | 1.7 |
| Sodium glutamate | 0.4 |
| Sugar | 0.4 |
| Mustard powder | 0.2 |
| Total | 100.0 |

The total cholesterol content of the oil-in-water emulsified food obtained was found to be $4.3 \times 10^{-3}\%$. It is estimated that the content of cholesterol derived from the processed dry egg yolk is approximately $3.6 \times 10^{-3}\%$ out of the above total cholesterol content and that the content of cholesterol derived from the vegetable oil is approximately $0.7 \times 10^{-3}\%$ out of the same.

This oil-in-water emulsified food was tasted. It was found that the food satisfactorily had the characteristic flavor and rich taste of egg yolk and that its palatability was excellent. This food was placed in a polyethylene-made bottle-shaped flexible container, and the container was sealed and then stored at normal temperature (around 20° C.) for 3 months. It was confirmed that the food was not separated into aqueous phase and oil phase throughout this period of time.

Example 2

In accordance with the formulation below (dextrin added, the percentage of the processed dry egg yolk and that of the vegetable oil decreased), an oil-in-water emulsified food of mayonnaise type was produced in the same manner as in Example 1.

It is noted that the processed dry egg yolk in the formulation below was prepared in the following manner: an egg yolk fluid was subjected to enzymatic processing with phospholipase $A_2$, thereby converting phospholipids contained in the egg yolk into lysophospholipids; the enzymatically processed egg yolk was dried; and the dried egg yolk was then subjected to processing for reducing cholesterol, using supercritical carbon dioxide. The processed dry egg yolk obtained in this manner and used in this example had a lyso-percentage of 40% and a cholesterol content of 0.4%.

| Ingredient | Percentage (%) |
| --- | --- |
| Oil phase ingredient: | |
| Vegetable oil | 77.1 |
| Aqueous phase ingredients: | |
| Water | 9.0 |
| Vinegar | 5.0 |
| Raw egg white | 4.0 |
| Processed dry egg yolk | 1.2 |
| (Percentage as calculated in | |
| terms of raw egg yolk: approx. 4.8%) | |
| Table salt | 1.7 |
| Dextrin | 1.0 |
| Sodium glutamate | 0.4 |
| Sugar | 0.4 |
| Mustard powder | 0.2 |
| Total | 100.0 |

The total cholesterol content of the oil-in-water emulsified food obtained was found to be $5.5 \times 10^{-3}\%$. It is estimated that the content of cholesterol derived from the processed dry egg yolk is approximately $4.8 \times 10^{-3}\%$ out of the above total cholesterol content and that the content of cholesterol derived from the vegetable oil is approximately $0.7 \times 10^{-3}\%$ out of the same.

This oil-in-water emulsified food was tasted. It was found that the food had the characteristic flavor and rich taste of egg yolk and that its taste was slightly lighter than that of the oil-in-water emulsified food of Example 1. This food was placed in a polyethylene-made bottle-shaped flexible container, and the container was sealed and then stored at normal temperature (around 20° C.) for 3 months. It was confirmed that the food was not separated into aqueous phase and oil phase throughout this period of time.

Example 3

In accordance with the formulation below, a mayonnaise-type oil-in-water emulsified food containing phytosterols was produced in the same manner as in Examples 1 and 2.

It is noted that the processed dry egg yolk in the formulation below was prepared in the following manner: an egg yolk fluid was subjected to enzymatic processing with phospholipase $A_2$, thereby converting phospholipids contained in the egg yolk into lysophospholipids; the enzymatically processed egg yolk was dried; and the dried egg yolk was then subjected to processing for reducing cholesterol, using supercritical carbon dioxide. The processed dry egg yolk obtained in this manner and used in this example had a lyso-percentage of 60% and a cholesterol content of 0.3%.

| Ingredient | Percentage (%) |
|---|---|
| Oil phase ingredient: | |
| Vegetable oil | 72.0 |
| Aqueous phase ingredients: | |
| Water | 10.7 |
| Vinegar | 5.0 |
| Raw egg white | 4.0 |
| Phytosterols | 3.0 |
| Processed dry egg yolk (Percentage as calculated in terms of raw egg yolk: approx. 6%) | 1.5 |

-continued

| Ingredient | Percentage (%) |
|---|---|
| Table salt | 1.7 |
| Dextrin | 1.0 |
| Sodium glutamate | 0.5 |
| Sugar | 0.4 |
| Mustard powder | 0.2 |
| Total | 100.0 |

The total cholesterol content of the oil-in-water emulsified food obtained was found to be $5.1 \times 10^{-3}\%$. It is estimated that the content of cholesterol derived from the processed dry egg yolk was approximately $4.5 \times 10^{-3}\%$ out of the above total cholesterol content and that the content of cholesterol derived from the vegetable oil was approximately $0.6 \times 10^{-3}\%$ out of the same.

This oil-in-water emulsified food was tasted. It was found that the food had the characteristic flavor and rich taste of egg yolk and that its palatability was excellent. This food was placed in a polyethylene-made bottle-shaped flexible container, and the container was sealed and then stored at normal temperature (around 20° C.) for 3 months. It was confirmed that the food was not separated into aqueous phase and oil phase throughout this period of time.

Test Example 1

How the quality of the oil-in-water emulsified food varies with the amount of the processed dry egg yolk incorporated was tested.

Oil-in-water emulsified food samples 1-a to 1-d were prepared in the same manner as in Example 2, provided that the processed dry egg yolk and dextrin were used in varying amounts as shown in Table 1. 300 g of each sample obtained was placed in a polyethylene-made bottle-shaped flexible container, and the container was sealed and stored at 20° C. for 3 months. Thereafter, these samples were evaluated in terms of appearance and taste.

"Yolk-Derived Cholesterol Content" in this table refers to the content of cholesterol derived from egg yolk in each oil-in-water emulsified food sample (cholesterol content, mass %), and its value was obtained by calculation based on the cholesterol content of the processed dry egg yolk (0.4%) and the percentage of the processed dry egg yolk.

TABLE 1

| Sample | Percentage of Processed Dry Egg Yolk (%) [Percentage as Calculated in Terms of Raw Egg Yolk(%)] | Percentage of Dextrin (%) | Yolk-Derived Cholesterol Content (%) | Evaluation | |
|---|---|---|---|---|---|
| | | | | Appearance | Taste |
| 1-a | 0.2[0.8] | 2.0 | $0.8 \times 10^{-3}$ | x separated | x not rich |
| 1-b | 0.7[2.8] | 1.5 | $2.8 \times 10^{-3}$ | o good | Δ moderately rich |
| 1-c | 1.2[4.8] | 1.0 | $4.8 \times 10^{-3}$ | o good | o rich |
| 1-d | 1.5[6.0] | 0.7 | $6.0 \times 10^{-3}$ | o good | o rich |

The test results were as shown in Table 1. It was found that Samples 1-c and 1-d, each containing 1.2% or more of the processed dry egg yolk, were most preferred, that Sample 1-b containing 0.7% of the processed dry egg yolk was acceptable as a product but that Sample 1-a containing only 0.2% of the processed dry egg yolk was unfavorable from the viewpoint of both appearance and taste.

Test Example 2

How the quality of the oil-in-water emulsified food varies with the cholesterol content of the processed dry egg yolk was tested.

Oil-in-water emulsified food samples 2-a to 2-e were prepared in the same manner as in Example 2, provided that processed dry egg yolks all having a lyso-percentage of 60% but having different cholesterol contents as shown in Table 2 were used. 300 g of each sample obtained was placed in a polyethylene-made bottle-shaped flexible container, and the container was sealed and stored at 20° C. for 3 months. Thereafter, these samples were evaluated in terms of appearance and taste.

"Yolk-Derived Cholesterol Content of Oil-in-Water Emulsified Food" in this table refers to the content of cholesterol derived from egg yolk in each oil-in-water emulsified food sample (cholesterol content, mass %), and its value was obtained by calculation based on the cholesterol content of the processed dry egg yolk and the processed dry egg yolk content of each sample (1.2%).

TABLE 2

| Sample | Cholesterol Content of Processed Dry Egg Yolk (%) | Yolk-Derived Cholesterol Content of Oil-in-Water Emulsified Food (%) | Evaluation Appearance | Taste |
|---|---|---|---|---|
| 2-a | 0.05 | $0.6 \times 10^{-3}$ | x separated | ○ good |
| 2-b | 0.10 | $1.2 \times 10^{-3}$ | Δ slightly separated | ○ good |
| 2-c | 0.15 | $1.8 \times 10^{-3}$ | ○ good | ○ good |
| 2-d | 0.20 | $2.4 \times 10^{-3}$ | ○ good | ○ good |
| 2-e | 0.30 | $3.6 \times 10^{-3}$ | ○ good | ○ good |

The test results were as shown in Table 2. It was found that Samples 2-c, 2-d and 2-e, each prepared by using the processed dry egg yolk having a cholesterol content of 0.15% or more, were most preferred and that Sample 2-b prepared by using the processed dry egg yolk having a cholesterol content of 0.1% was acceptable as a product although it had some problems. On the other hand, Sample 2-a prepared by using the processed dry egg yolk having a cholesterol content of 0.05% underwent separation, so that it was unqualified as a product.

Test Example 3

How the quality of the oil-in-water emulsified food varies with the lyso-percentage of the processed dry egg yolk was tested.

Oil-in-water emulsified food samples 3-a to 3-f were prepared in the same manner as in Example 1, provided that processed dry egg yolks all having a cholesterol content of 0.3% but having different lyso-percentages as shown in Table 3 were used. 300 g of each sample obtained was placed in a polyethylene-made bottle-shaped flexible container, and the container was sealed and stored at 20° C. for 3 months. Thereafter, these samples were evaluated in terms of appearance and taste.

TABLE 3

| Sample | Lyso-Percentage (%) | Evaluation Appearance | Taste |
|---|---|---|---|
| 3-a | 0 | x cracks found/separated | Δ musty odor |
| 3-b | 10 | Δ small cracks found | ○ good |
| 3-c | 30 | ○ good | ○ good |
| 3-d | 50 | ○ good | ○ good |
| 3-e | 80 | ○ good | ○ good |
| 3-f | 90 | ○ good | Δ slightly bitter |

The test results were as shown in Table 3. It was found that Samples 3-c, 3-d and 3-e, each prepared by using the processed dry egg yolk having a lyso-percentage of from 30% to 80%, were most preferred and that Samples 3-b and 3-f prepared by using the processed dry egg yolks having lyso-percentages of 10% and 90%, respectively, were acceptable as products although they had some problems. On the other hand, Sample 3-a prepared by using the processed dry egg yolk that had not been subjected to enzymatic processing was found to be unfavorable from the viewpoint of both appearance and taste.

Example 4

In accordance with the formulation below, an oil-in-water emulsified food of mayonnaise type was produced in the following manner: the aqueous phase ingredients were thoroughly mixed; the oil phase ingredient was added to this mixture with stirring; and the resulting mixture was emulsified by a conventional method.

It is noted that the processed dry egg yolk in the formulation below was prepared in the following manner: an egg yolk fluid was subjected to enzymatic processing with phospholipase $A_2$, thereby converting phospholipids contained in the egg yolk into lysophospholipids; the enzymatically processed egg yolk was dried; and the dried egg yolk was then subjected to processing for reducing cholesterol, using supercritical carbon dioxide. The processed dry egg yolk obtained in this manner and used in this example had a lyso-percentage of 60% and a cholesterol content of 0.2%.

| Ingredient | Percentage (%) |
|---|---|
| Oil phase ingredient: | |
| Vegetable oil | 77.5 |
| Aqueous phase ingredients: | |
| Water | 6.0 |
| Vinegar | 5.0 |
| Raw egg white | 7.0 |
| Processed dry egg yolk (Percentage as calculated in terms of raw egg yolk: approx. 7.2%) | 1.8 |
| Table salt | 1.7 |
| Sodium glutamate | 0.4 |
| Sugar | 0.4 |
| Mustard powder | 0.2 |
| Total | 100.0 |

The total cholesterol content of the oil-in-water emulsified food obtained was found to be $4.3 \times 10^{-3}\%$. It is estimated that the content of cholesterol derived from the processed dry egg yolk is approximately $3.6 \times 10^{-3}\%$ out of the above total cholesterol content and that the content of cholesterol derived from the vegetable oil is approximately $0.7 \times 10^{-3}\%$ out of the same.

Example 5

In accordance with the formulation below, an oil-in-water emulsified food of mayonnaise type was produced in the same manner as in Example 4.

It is noted that the processed dry egg yolk in the formulation below was prepared in the following manner: an egg yolk fluid was subjected to enzymatic processing with phospholipase $A_2$, thereby converting phospholipids contained in the egg yolk into lysophospholipids; the enzymatically processed egg yolk was dried; and the dried egg yolk was then subjected to processing for reducing cholesterol, using supercritical carbon dioxide. The processed dry egg yolk obtained in this manner and used in this example had a lyso-percentage of 40% and a cholesterol content of 0.4%.

| Ingredient | Percentage (%) |
|---|---|
| Oil phase ingredient: | |
| Vegetable oil | 75.7 |
| Aqueous phase ingredients: | |
| Water | 12.7 |

-continued

| Ingredient | Percentage (%) |
|---|---|
| Vinegar | 5.0 |
| Dried egg white | 0.7 |
| (Percentage as calculated in terms of raw egg white: approx. 7.0%) | |
| Processed dry egg yolk | 1.2 |
| (Percentage as calculated in terms of raw egg yolk: approx. 4.8%) | |
| Table salt | 1.7 |
| Dextrin | 2.0 |
| Sodium glutamate | 0.4 |
| Sugar | 0.4 |
| Mustard powder | 0.2 |
| Total | 100.0 |

The total cholesterol content of the oil-in-water emulsified food obtained was found to be $5.5\times10^{-3}\%$. It is estimated that the content of cholesterol derived from the processed dry egg yolk is approximately $4.8\times10^{-3}\%$ out of the above total cholesterol content and that the content of cholesterol derived from the vegetable oil is approximately $0.7\times10^{-3}\%$ out of the same.

Example 6

In accordance with the formulation below, an oil-in-water emulsified food of mayonnaise type was produced in the same manner as in Examples 4 and 5, where xanthane gum had been dispersed in the vegetable oil in advance.

It is noted that the processed dry egg yolk in the formulation below was prepared in the following manner: an egg yolk fluid was subjected to enzymatic processing with phospholipase $A_2$, thereby converting phospholipids contained in the egg yolk into lysophospholipids; the enzymatically processed egg yolk was dried; and the dried egg yolk was then subjected to processing for reducing cholesterol, using supercritical carbon dioxide. The processed dry egg yolk obtained in this manner and used in this example had a lyso-percentage of 60% and a cholesterol content of 0.3%.

| Ingredient | Percentage (%) |
|---|---|
| Oil phase ingredient: | |
| Vegetable oil | 77.0 |
| Aqueous phase ingredients: | |
| Water | 12.5 |
| Vinegar | 5.0 |
| Xanthane gum | 0.2 |
| Processed dry egg yolk | 1.5 |
| (Percentage as calculated in terms of raw egg yolk: approx. 6%) | |
| Table salt | 1.7 |
| Dextrin | 1.0 |
| Sodium glutamate | 0.5 |
| Sugar | 0.4 |
| Mustard powder | 0.2 |
| Total | 100.0 |

The total cholesterol content of the oil-in-water emulsified food obtained was found to be $5.2\times10^{-3}\%$. It is estimated that the content of cholesterol derived from the processed dry egg yolk is approximately $4.5\times10^{-3}\%$ out of the above total cholesterol content and that the content of cholesterol derived from the vegetable oil is approximately $0.7\times10^{-3}\%$ out of the same.

Test Example 4

To test the emulsion stability during storage of the oil-in-water emulsified foods according to the present invention, the following four different types of samples were prepared:

Test sample 1: Oil-in-water emulsified food of Example 4

Test sample 2: Oil-in-water emulsified food of Example 5

Test sample 3: Oil-in-water emulsified food of Example 6

Test sample 4: Oil-in-water emulsified food of Example 2 (containing 4.0% of raw egg white)

300 g of each sample was placed in a polyethylene-made bottle-shaped flexible container, and the container was sealed and stored at 20° C. for 5 months. Thereafter, these samples were evaluated in terms of appearance and taste. The results were as shown in Table 4.

"Yolk-Derived Cholesterol Content" in this table refers to the content of cholesterol derived from egg yolk in each sample (cholesterol content, mass %), and its value was obtained by calculation based on the cholesterol content of the processed dry egg yolk and the percentage of the processed dry egg yolk.

TABLE 4

| Sample | Percentage of Egg White (as Calculated in Terms of Raw Egg White) or Xanthane Gum (%) | Yolk-Derived Cholesterol Content (%) | Evaluation | |
|---|---|---|---|---|
| | | | Appearance | Taste |
| 1 | 7.0 | $3.6 \times 10^{-3}$ | ○ good | ○ good |
| 2 | 7.0 | $4.8 \times 10^{-3}$ | ○ good | ○ good |
| 3 | 0.2 | $4.5 \times 10^{-3}$ | ○ good | ○ good |
| 4 | 4.0 | $4.8 \times 10^{-3}$ | x partially separated | ○ good |

The data shown in Table 4 demonstrate the following fact: an oil-in-water emulsified food that does not undergo separation during storage at 20° C. for 5 months and that has the characteristic flavor and rich taste of egg yolk can be obtained if an increased amount of egg white or a prescribed amount of xanthane gum is incorporated into the emulsified food.

Test Example 5

How the quality of the oil-in-water emulsified food varies with the amount of the processed dry egg yolk incorporated was tested.

Oil-in-water emulsified food samples 5-a to 5-d were prepared in the same manner as in Example 5, provided that the processed dry egg yolk and dextrin were used in varying amounts as shown in Table 5. 300 g of each sample obtained was placed in a polyethylene-made bottle-shaped flexible container, and the container was sealed and stored at 20° C. for 5 months. Thereafter, these samples were evaluated in terms of appearance and taste.

"Yolk-Derived Cholesterol Content" in this table refers to the content of cholesterol derived from egg yolk in each oil-in-water emulsified food sample (mass %), and its value was obtained by calculation based on the cholesterol content of the processed dry egg yolk (0.4%) and the percentage of the processed dry egg yolk.

TABLE 5

| Sample | Percentage of Processed Dry Egg Yolk (%) [Percentage as Calculated in Terms of Raw Egg Yolk(%)] | Percentage of Dextrin (%) | Yolk-Derived Cholesterol Content (%) | Evaluation Apperance | Taste |
|---|---|---|---|---|---|
| 5-a | 0.2[0.8] | 3.0 | $0.8 \times 10^{-3}$ | x separated | x not rich |
| 5-b | 0.7[2.8] | 2.5 | $2.8 \times 10^{-3}$ | ○ good | Δ moderately rich |
| 5-c | 1.2[4.8] | 2.0 | $4.8 \times 10^{-3}$ | ○ good | ○ rich |
| 5-d | 1.5[6.0] | 1.7 | $6.0 \times 10^{-3}$ | ○ good | ○ rich |

The test results were as shown in Table 5. It was found that Samples 5-c and 5-d, each containing 1.2% or more of the processed dry egg yolk, were most preferred and that Sample 5-b containing 0.7% of the processed dry egg yolk was acceptable as a product. On the other hand, Sample 5-a containing 0.2% of the processed dry egg yolk was found to be unfavorable from the viewpoint of both appearance and taste.

Test Example 6

How the quality of the oil-in-water emulsified food varies with the cholesterol content of the processed dry egg yolk was tested.

Oil-in-water emulsified food samples 6-a to 6-e were prepared in the same manner as in Example 5, provided that processed dry egg yolks all having a lyso-percentage of 60% but having different cholesterol contents as shown in Table 6 were used. 300 g of each sample obtained was placed in a polyethylene-made bottle-shaped flexible container, and the container was sealed and stored at 20° C. for 5 months. Thereafter, these samples were evaluated in terms of appearance and taste.

"Yolk-Derived Cholesterol Content of Oil-in-Water Emulsified Food" in this table refers to the content of cholesterol derived from egg yolk in each oil-in-water emulsified food sample (mass %), and its value was obtained by calculation based on the cholesterol content of the processed dry egg yolk and the percentage of the processed dry egg yolk (1.2%).

TABLE 6

| Sample | Cholesterol Content of Processed Dry Egg Yolk (%) | Yolk-Derived Cholesterol Content of Oil-in-Water Emulsified Food (%) | Evaluation Appearance | Taste |
|---|---|---|---|---|
| 6-a | 0.05 | $0.6 \times 10^{-3}$ | x separated | ○ good |
| 6-b | 0.10 | $1.2 \times 10^{-3}$ | Δ slightly separated | ○ good |
| 6-c | 0.15 | $1.8 \times 10^{-3}$ | ○ good | ○ good |
| 6-d | 0.20 | $2.4 \times 10^{-3}$ | ○ good | ○ good |
| 6-e | 0.30 | $3.6 \times 10^{-3}$ | ○ good | ○ good |

The test results were as shown in Table 6. It was found that Samples 6-c, 6-d and 6-e, each prepared by using the processed dry egg yolk having a cholesterol content of 0.15% or more, were most preferred and that Sample 6-b prepared by using the processed dry egg yolk having a cholesterol content of 0.1% was acceptable as a product although it had some drawbacks. On the other hand, Sample 6-a prepared by using the processed dry egg yolk having a cholesterol content of 0.05% underwent separation; this sample was thus unqualified as a product.

Test Example 7

How the quality of the oil-in-water emulsified food varies with the lyso-percentage of the processed dry egg yolk was tested.

Oil-in-water emulsified food samples 7-a to 7-f were prepared in the same manner as in Example 4, provided that processed dry egg yolks all having a cholesterol content of 0.3% but having different lyso-percentages as shown in Table 7 were used. 300 g of each sample obtained was placed in a polyethylene-made bottle-shaped flexible container, and the container was sealed and stored at 20° C. for 5 months. These samples were then evaluated in terms of appearance and taste.

TABLE 7

| Sample | Lyso-Percentage (%) | Evaluation Appearance | Taste |
|---|---|---|---|
| 7-a | 0 | x cracks found/ separated | Δ musty odor |
| 7-b | 10 | Δ small cracks found | ○ good |
| 7-c | 30 | ○ good | ○ good |
| 7-d | 50 | ○ good | ○ good |
| 7-e | 80 | ○ good | ○ good |
| 7-f | 90 | ○ good | Δ slightly bitter |

The test results were as shown in Table 7. It was found that Samples 7-c, 7-d and 7-e, each prepared by using the processed dry egg yolk having a lyso-percentage of from 30% to 80%, were most preferred and that Samples 7-b and 7-f produced by using the processed dry egg yolks having lyso-percentages of 10% and 90%, respectively, were acceptable as products although they had some drawbacks. On the other hand, Sample 7-a prepared by using the processed dry egg yolk that had not been subjected to enzymatic processing was unfavorable from the viewpoint of both appearance and taste.

The oil-in-water emulsified food of Example 6 containing xanthane gum was also tested in the same manner as the above. The results obtained were almost the same as those shown in Table 7.

Test Example 8

How the quality of the oil-in-water emulsified food varies with the amount of egg white incorporated was tested.

Oil-in-water emulsified food samples 8-a to 8-e were prepared in the same manner as in Example 5, provided that the dry egg white and dextrin were used in varying amounts as shown in Table 8. 300 g of each sample obtained was placed in a polyethylene-made bottle-shaped flexible container, and the container was sealed and stored at 20° C. for 5 months. These samples were then evaluated in terms of appearance and taste.

TABLE 8

| Sample | Percentage of Dry Egg White (%) [Percentage as Calculated in Terms of Raw Egg White (%)] | Percentage of Dextrin (%) | Evaluation Appearance | Taste |
|---|---|---|---|---|
| 8-a | 0.5[5.0] | 2.2 | x partially seperated | o good |
| 8-b | 0.6[6.0] | 2.1 | o good | o good |
| 8-c | 1.0[10.0] | 1.7 | o good | o good |
| 8-d | 2.0[20.0] | 0.7 | o good | o good |
| 8-e | 2.5[25.0] | 0.2 | o good | x no good (light) |

The test results were as shown in Table 8. The oil-in-water emulsified food samples containing 0.6% or more of the dry egg white (6.0% or more as calculated in terms of raw egg white) do not undergo separation. However, when the percentage of the dry egg white is 2.5% or more (25% or more as calculated in terms of raw egg white), the oil-in-water emulsified food sample is to have a light taste different from the taste of conventional mayonnaise.

Test Example 9

How the quality of the oil-in-water emulsified food varies with the amount of xanthane gum incorporated was tested.

Oil-in-water emulsified food samples 9-a to 9-d were prepared in the same manner as in Example 6, provided that xanthane gum and dextrin were used in varying amounts as shown in Table 9. 300 g of each sample obtained was placed in a polyethylene-made bottle-shaped flexible container, and the container was sealed and stored at 20° C. for 5 months. These samples were then evaluated in terms of appearance and taste.

TABLE 9

| Sample | Percentage of Xanthane Gum (%) | Percentage of Dextrin (%) | Evaluation Appearance | Taste |
|---|---|---|---|---|
| 9-a | 0.01 | 1.19 | x partially | o good |
| 9-b | 0.03 | 1.17 | o good | o good |
| 9-c | 0.05 | 1.15 | o good | o good |
| 9-d | 0.30 | 0.90 | o good | o good |

The test results were as shown in Table 9. The oil-in-water emulsified food samples containing 0.03% or more of xanthane gum do not undergo separation; these samples are thus preferred.

The oil-in-water emulsified foods of the present invention contain egg yolk in an amount of 2.8% or more as calculated in terms of raw egg yolk. Therefore, they are excellent in emulsion stability, scarcely undergo separation during storage, and fully have the characteristic flavor and rich taste of egg yolk. Further, the oil-in-water emulsified foods of the present invention have a yolk-derived cholesterol content of $7 \times 10^{-4}\%$ or more but have a total cholesterol content of less than $6 \times 10^{-3}\%$. Therefore, although they can be used just like conventional mayonnaise or dressings, they are effective in dramatically reducing the cholesterol intake. Furthermore, the oil-in-water emulsified foods of the present invention further containing egg white in an amount of 6% or more as calculated in terms of raw egg white, or containing at least 0.03% of xanthane gum are more excellent in emulsion stability, and hardly undergo separation even when stored at 20° C. for 5 months or more. Moreover, the oil-in-water emulsified foods of the present invention further containing phytosterols can reduce blood cholesterol levels.

In addition, according to the method of the present invention for producing an oil-in-water emulsified food, it is possible to efficiently mass-produce an oil-in-water emulsified food which has a high egg yolk content, which has a good taste, which has emulsion stability high enough to prevent separation during storage even at 20° C. for 5 months or more, and which has a significantly reduced cholesterol content.

What is claimed is:

1. An oil-in-water emulsified food having an egg yolk content as calculated in terms of raw egg yolk of 2.8% or more, a content of cholesterol derived from egg yolk of $7 \times 10^{-4}\%$ or more, and a total cholesterol content of less than $6 \times 10^{-3}\%$.

2. The oil-in-water emulsified food according to claim 1, wherein the egg yolk content as calculated in terms of raw egg yolk is 4.8% or more.

3. The oil-in-water emulsified food according to claim 1, wherein the egg yolk has been subjected to enzymatic processing and to processing for reducing cholesterol.

4. The oil-in-water emulsified food according to claim 3, wherein the egg yolk has been enzymatically processed to have a lyso-percentage of 10% or more.

5. The oil-in-water emulsified food according to claim 1, containing phytosterols.

6. A method for producing the oil-in-water emulsified food set forth in claim 1, comprising the steps of:
    subjecting an egg yolk fluid to enzymatic processing, thereby converting phospholipids contained in the egg yolk into lysophospholipids,
    subjecting the enzymatically processed egg yolk to processing for reducing cholesterol, thereby obtaining processed dry egg yolk retaining at least 0.1% of cholesterol, and
    mixing the processed dry egg yolk with other ingredients in an amount of at least 0.7% of all the ingredients used, thereby obtaining the oil-in-water emulsified food.

7. An oil-in-water emulsified food having an egg yolk content as calculated in terms of raw egg yolk of 2.8% or more, an egg white content as calculated in terms of raw egg white of 6% or more, a content of cholesterol derived from egg yolk of $7 \times 10^{-4}\%$ or more, and a total cholesterol content of less than $6 \times 10^{-3}\%$.

8. An oil-in-water emulsified food having an egg yolk content as calculated in terms of raw egg yolk of 2.8% or more, a xanthane gum content of 0.03% or more, a content of cholesterol derived from egg yolk of $7 \times 10^{-4}\%$ or more, and a total cholesterol content of less than $6 \times 10^{-3}\%$.

9. The oil-in-water emulsified food according to claim 7, wherein the egg yolk has been subjected to enzymatic processing and to processing for reducing cholesterol.

10. The oil-in-water emulsified food according to claim 9, wherein the egg yolk has been enzymatically processed to have a lyso-percentage of 10% or more.

11. The oil-in-water emulsified food according to claim 7, containing phytosterols.

12. A method for producing the oil-in-water emulsified food set forth in claim 7, comprising the steps of:
    subjecting an egg yolk fluid to enzymatic processing, thereby converting phospholipids contained in the egg yolk into lysophospholipids, subjecting the enzymatically processed egg yolk to processing for reducing cholesterol, thereby obtaining processed dry egg yolk retaining at least 0.1% of cholesterol, and mixing the processed dry egg yolk with egg white or xanthan gum and other ingredients in amounts of at least 0.7%, and at least 6% as calculated in terms of raw egg white or at least 0.03%, respectively, based on all the ingredients used, thereby obtaining the oil-in-water emulsified food.

13. A method for producing the oil-in-water emulsified food set forth in claim 8, comprising the steps of:

subjecting an egg yolk fluid to enzymatic processing, thereby converting phospholipids contained in the egg yolk into lysophospholipids, subjecting the enzymatically processed egg yolk to processing for reducing cholesterol, thereby obtaining processed dry egg yolk retaining at least 0.1% of cholesterol, and mixing the processed dry egg yolk with egg white or xanthane gum and other ingredients in amounts of at least 0.7%, and at least 6% as calculated in terms of raw egg white or at least 0.03%, respectively, based on all the ingredients used, thereby obtaining the oil-in-water emulsified food.

14. The oil-in-water emulsified food according to claim 2, wherein the egg yolk has been subjected to enzymatic processing and to processing for reducing cholesterol.

15. The oil-in-water emulsified food according to claim 2, containing phytosterols.

16. The oil-in-water emulsified food according to claim 3, containing phytosterols.

17. The oil-in-water emulsified food according to claim 4, containing phytosterols.

18. The oil-in-water emulsified food according to claim 8, wherein the egg yolk has been subjected to enzymatic processing and to processing for reducing cholesterol.

19. The oil-in-water emulsified food according to claim 8, containing phytosterols.

20. The oil-in-water emulsified food according to claim 9, containing phytosterols.

21. The oil-in-water emulsified food according to claim 10, containing phytosterols.

\* \* \* \* \*

UNITED STATES PATENT AND TRADEMARK OFFICE
CERTIFICATE OF CORRECTION

PATENT NO.   : 6,660,312 B2
DATED        : December 9, 2003
INVENTOR(S)  : Masao Tobita et al.

It is certified that error appears in the above-identified patent and that said Letters Patent is hereby corrected as shown below:

<u>Column 17,</u>
Line 47, Table 9, under column four entitled "Appearance", first sample "x partially" should read -- x partially separated --.

<u>Column 19,</u>
Line 6, "xanthan gum" should read -- xanthane gum --.

Signed and Sealed this

Eighth Day of June, 2004

JON W. DUDAS
*Acting Director of the United States Patent and Trademark Office*